Sept. 22, 1959     D. J. BURKE     2,904,862
CAST WELDING APPARATUS

Filed Feb. 27, 1958     2 Sheets-Sheet 1

INVENTOR.
DONALD J. BURKE
BY
Oberlin & Limbach
ATT'YS

United States Patent Office 2,904,862
Patented Sept. 22, 1959

2,904,862

CAST WELDING APPARATUS

Donald J. Burke, East Cleveland, Ohio, assignor to Erico Products, Inc., Cleveland, Ohio, a corporation of Ohio Application February 27, 1958, Serial No. 717,950

8 Claims. (Cl. 22—116)

This invention relates as indicated to cast welding apparatus, and more particularly to apparatus adapted to utilize a metal producing exothermic reaction mixture of the general type disclosed in Patent No. 2,229,045 to Charles A. Cadwell.

In my prior Patent 2,801,914, I disclose and claim a novel exothermic reaction mixture for producing a molten metal charge particularly suitable for use in the welding of small cables and the like, and in my co-pending application Serial No. 422,032 filed April 9, 1954, for "Welding Apparatus," I disclose and claim novel apparatus particularly adapted for cast welding together the opposed ends of two elongated metal members such as stranded copper cables, for example. The present invention is particularly concerned with improvements in apparatus of the general type disclosed in such above-identified co-pending application.

The welding material disclosed and claimed in Cadwell Patent No. 2,229,045 has been very successfully employed in the cast welding of rail bonds to the sides of rails and for many other purposes. Such welding material comprises a mixture of copper oxide and a crushed copper-aluminum alloy which when ignited will produce a charge of molten copper suitable for immediate use in the welding of a copper or copper alloy stranded conductor to a steel rail or the like. In my prior Patent 2,801,914, I disclose and claim a modified exothermic reaction mixture including preferably a small amount of silver to enhance certain desirable properties of the weld metal.

It is conventional to employ graphite mold blocks which receive or conform to the portions of the articles to be welded, the exothermic reaction mixture being placed within an appropriate crucible and ignited, whereupon the molten weld metal is produced and delivered to the mold cavity. While graphite is in many ways the most suitable material for use in the manufacture of such crucibles and molds, it is nevertheless somewhat fragile and is also subject to erosion in use. Consequently, the graphite parts of the cast welding apparatus not infrequently require replacement in the field, and it has been a rather common practice to discard not only such parts but also the supporting frame and handle portions rather than to attempt to remove the graphite parts and replace them as required. It would obviously be both an economy and a convenience simply to replace the graphite parts in a suitable holder, and it is accordingly a principal object of my invention to provide cast welding apparatus including handle and support means for the graphite mold parts which may be quickly and conveniently secured to the latter and equally quickly and conveniently removed when replacement becomes desirable.

Another object is to provide such apparatus which will facilitate clamping together and unclamping certain graphite mold parts.

A further object is to provide such apparatus which will be economical both in first cost and in operation, but which will firmly and securely receive and support the graphite mold elements.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
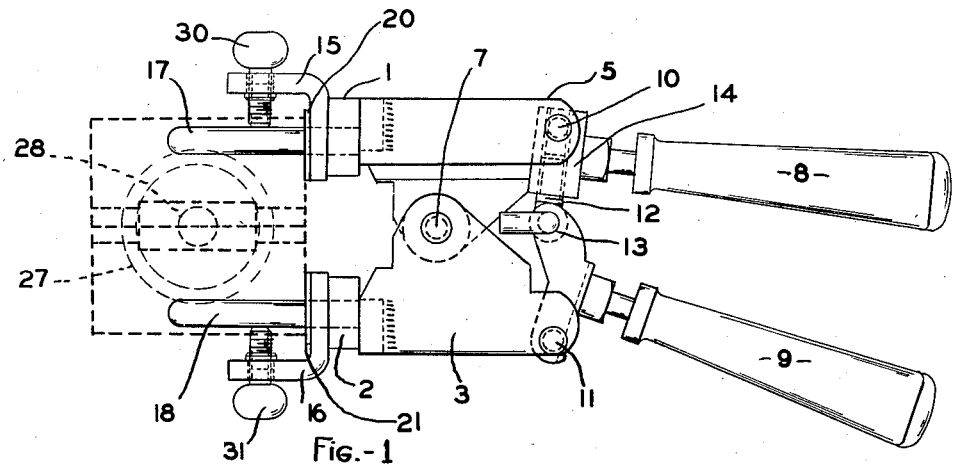
Fig. 1 is a top plan view of my new mold supporting apparatus with the mold parts indicated in dotted line.
Figure 2:
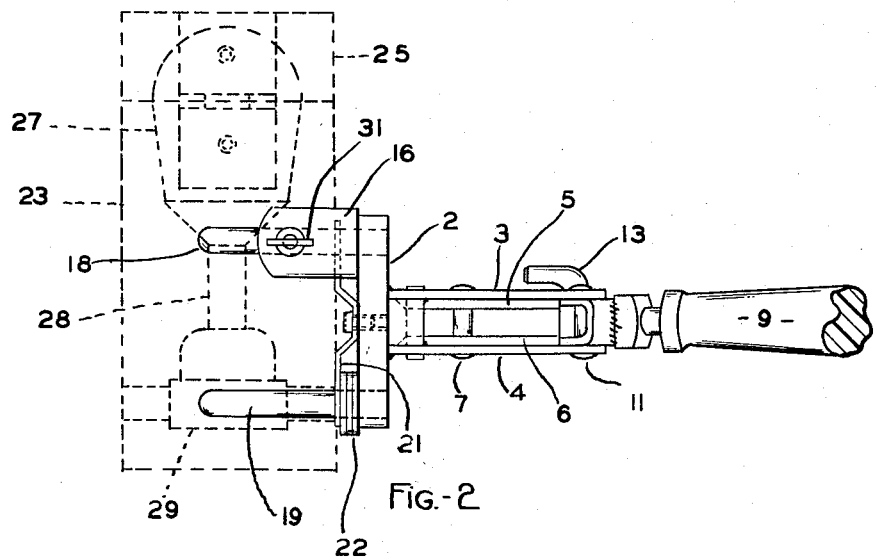
Fig. 2 is a side elevation of Fig. 1; assembly.

Referring now more particularly to said drawing, the embodiment of my invention there illustrated comprises two mold supporting members 1 and 2 having pairs of spaced web members 3 and 4, and 5 and 6 respectively welded thereto, such web members being pivotally interconnected at 7. Handles 8 and 9 are pivotally attached to such pairs of web members at 10 and 11 respectively and are themselves interconnected by means of a screw 12 pivotally connected at one end to handle 9 by means of pin 13 and threaded in the inner end portion 14 of handle 8. By adjusting such screw prior to insertion of pivot pin 13, the handle members together with such pivotally connected web members form a toggle linkage for clamping the mold parts together as explained more in detail below.

A pair of angle brackets 15 and 16 are pivotally mounted on projecting studs or fingers 17 and 18 extending from frame members 1 and 2 respectively. A similar pair of studs such as 19 project parallel thereto from the lower ends of frame members 1 and 2. Metal strips 20 and 21 are affixed to the frame members 1 and 2, being apertured for passage of the respective studs therethrough and spaced at their lower ends from such frame members by means of shims 22.

Figure 3:
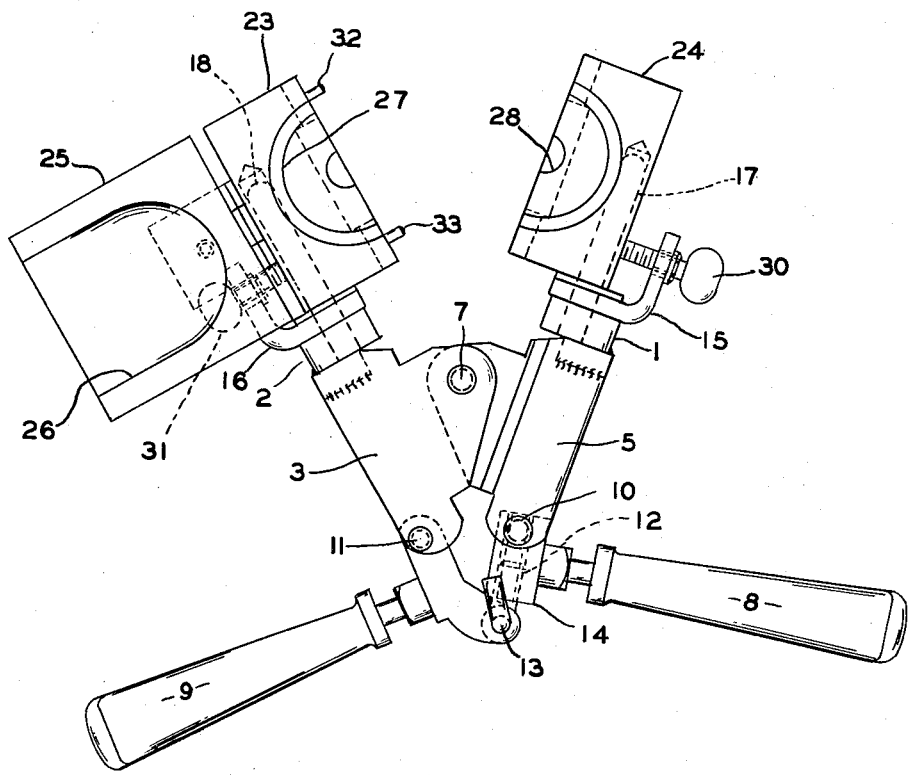
Fig. 3 is a top plan view generally corresponding to Fig. 1 but showing the holder apparatus manipulated to separate the mold parts for release of the cast welded connection and cleaning of the crucible and mold.

The studs such as 17, 18 and 19 are adapted to be inserted within closely fitting apertures in the graphite mold sections 23 and 24. While various types of separable molds may obviously be employed with my new holder, the example illustrated comprises the aforesaid two substantially equal size graphite blocks 23 and 24, the former having a graphite lid 25 hingedly connected thereto and provided with a hollowed-out portion 26 in its underside to direct laterally gases escaping from the crucible 27 during reaction of the exothermic material. A sprue 28 leads downwardly from the bottom of the crucible to the mold cavity 29 in which the two ends of stranded conductors or the like to be welded are adapted to be positioned. As best shown in Figs. 1 and 3, the vertical parting line between the two graphite blocks 23 and 24 passes through the crucible, sprue and mold cavity. Accordingly, when the two mold sections are clamped together through the toggle action of the handle frame, the exothermic reaction mixture may be placed in the crucible and ignited to produce the molten metal which thereupon drops into the mold cavity 29 to effect the weld. When the handles 8 and 9 are thereupon moved apart as shown in Fig. 3, breaking the toggle, the mold sections are likewise moved apart to release the work-piece and to expose the interior of the crucible, sprue and mold cavity for cleaning prior to re-use.

The mold sections 23 and 24, being mounted on the projecting studs as aforesaid, are secured in proper position thereon by means of thumb screws 30 and 31 threaded in angle brackets 15 and 16 respectively. Such screws extend through apertures in the sides of the graphite blocks 24 and 23 to bear against the corresponding studs 17 and 18, such screws fitting reasonably snugly in the apertures and thereby ensuring proper maintenance of the mold sections in mating position. Dowels 32 and 33 may also be provided on one of the mold sections to fit within corresponding apertures in the opposed face of the other section.

A great advantage of my new operating holder and mold block assembly as above described is that the graphite blocks may readily be removed and replaced in the field without disassembling the supporting frame or discarding other portions of the apparatus. The mold block sections are simply drilled to receive the clamp attaching means, and proper registration of the mold parts is positively assured in use.

Other modes of applying the principle of the invention may be employed, change being made as regards the details described, provided the features stated in any of the following claims or the equivalent of such be employed.

I therefore particularly point out and distinctly claim as my invention:

1. Cast welding apparatus adapted for use with material capable of an exothermic metal-producing reaction comprising two frame members pivotally interconnected for relative oscillatory movement, a pair of handles respectively pivotally connected to each of said frame members for oscillatory movement about axes parallel to each other and to such pivotal connection of said two frame members, a screw element threadedly engaged in one said handle adjacent such pivotal connection of the latter with the corresponding frame member and extending toward the other said handle, whereby by turning said screw element the latter may be adjustably extended toward the other said handle member, a pivot pin disengageably pivotally connecting said screw element and said other handle member to form a toggle joint therewith, a pair of parallel elongated studs extending from each of said frame members away from said handle members, said studs being adapted to be received in corresponding closely fitting holes in mating graphite mold sections, angle brackets on said frame members extending parallel and adjacent to one said stud on each said frame member, and screw means threadedly mounted in said angle brackets normal to said adjacent studs adapted to extend inwardly through corresponding apertures in such graphite mold sections to engage and bear against the sides of said adjacent studs and thereby secure such mold sections firmly upon the latter.

2. The apparatus of claim 1, including mating graphite mold sections mounted directly on said respective pairs of studs.

3. The apparatus of claim 1, including mating graphite mold sections mounted directly on said respective pairs of studs, and dowel pins on one said mold section adapted to engage in holes in the other said section when said sections are clamped together in mating engagement through action of said toggle joint.

4. The apparatus of claim 1, wherein said screw means in said angle brackets are thumb screws.

5. Cast welding apparatus adapted for use with material capable of exothermic metal-producing reaction comprising two frame members pivotally interconnected for relative oscillatory movement, handles on said respective frame members, a pair of parallel elongated studs extending from each of said frame members away from said handles adapted to be received in corresponding closely fitting holes in mating graphite mold sections, said studs being in a direction generally parallel to said respective handles when such mold sections are in engagement, brackets on said respective frame members extending parallel and adjacent to one said stud on each frame member, laterally protruding elements mounted on said brackets generally normal to said adjacent studs, said laterally protruding elements being adapted to extend inwardly into corresponding openings in such graphite mold sections to thereby secure such mold sections firmly upon the studs, means acting on said frame members effective to pivot the same to hold such mold sections together until overcome by manual movement of said handles, and manually operable means to move said laterally protruding elements away from said adjacent studs whereby such mold sections may be inserted on or removed from said studs.

6. The apparatus of claim 5 wherein said laterally protruding elements engage and bear against the sides of said adjacent studs through such corresponding openings.

7. The apparatus of claim 5 wherein said brackets are angle brackets, the angled portion away from said laterally protruding elements being secured to said frame members coaxially with said adjacent studs.

8. Cast welding apparatus adapted for use with material capable of exothermic metal-producing reaction comprising two frame members pivotally interconnected for relative oscillatory movement, a pair of handles respectively pivotally conected to each of said frame members for oscillatory movement about axes parallel to each other and to such pivotal connection of said two frame members, a screw element threadedly engaged in one said handle adjacent such pivotal connection of the latter with the corresponding frame member and extending toward the other said handle, whereby by turning said screw element the latter may be adjustably extended toward the other said handle member, a pivot pin disengageably pivotally connecting said screw element and said other handle member to form a toggle joint therewith, a pair of parallel elongated studs extending from each of said frame members away from said handle members, said studs being adapted to be received in corresponding closely fitting holes in mating graphite mold sections, angle brackets on said frame members extending parallel and adjacent to one said stud on each said frame member, and laterally protruding elements mounted on said angle brackets normal to said adjacent studs adapted to extend inwardly through corresponding apertures in such graphite mold sections to engage and bear against the sides of said adjacent studs and thereby secure such mold sections firmly upon the latter.

References Cited in the file of this patent

UNITED STATES PATENTS

| 1,642,484 | Burgett | Sept. 13, 1927 |
| 1,763,977 | McNeely | June 17, 1930 |